(12) United States Patent
Schabner et al.

(10) Patent No.: US 11,420,689 B2
(45) Date of Patent: Aug. 23, 2022

(54) SOIL PROCESSING MACHINE

(71) Applicant: Hamm AG, Tirschenreuth (DE)

(72) Inventors: Heiko Schabner, Tirschenreuth (DE); Rainer Krockauer, Plössberg (DE); Peter Preisinger, Tirschenreuth (DE)

(73) Assignee: Hamm AG, Tirschenreuth (DE)

( * ) Notice: Subject to any disclaimer, the term of this patent is extended or adjusted under 35 U.S.C. 154(b) by 247 days.

(21) Appl. No.: 16/782,831

(22) Filed: Feb. 5, 2020

(65) Prior Publication Data
US 2020/0255070 A1 Aug. 13, 2020

(30) Foreign Application Priority Data

Feb. 7, 2019 (DE) .......................... 102019102999.6

(51) Int. Cl.
*B62D 33/06* (2006.01)
*B60J 5/04* (2006.01)
*E05B 79/12* (2014.01)
*E05B 85/14* (2014.01)

(52) U.S. Cl.
CPC ........ *B62D 33/0617* (2013.01); *B60J 5/0468* (2013.01); *B60J 5/0472* (2013.01); *B60J 5/0497* (2013.01); *E05B 79/12* (2013.01); *E05B 85/14* (2013.01); *E05Y 2900/518* (2013.01); *E05Y 2900/531* (2013.01)

(58) Field of Classification Search
CPC ..... B62D 33/00; B62D 33/0617; B60J 5/0497
USPC .................................................. 296/190.11
See application file for complete search history.

(56) References Cited

U.S. PATENT DOCUMENTS

| 6,502,896 B1 * | 1/2003 | Nakata ..................... E02F 9/163 296/190.05 |
| 7,575,272 B2 * | 8/2009 | Ishii ....................... B60J 5/0487 296/190.04 |
| 2012/0001454 A1 | 1/2012 | Murakami et al. |

(Continued)

FOREIGN PATENT DOCUMENTS

| DE | 102016007169 | 12/2017 |
| EP | 2402187 | 1/2012 |
| EP | 2679729 | 1/2014 |

(Continued)

OTHER PUBLICATIONS

Extended European Search Report for German patent application No. 10 2019 102 999.6, dated Jul. 8, 2020, 7 pages (German).

(Continued)

*Primary Examiner* — Joseph D. Pape
(74) *Attorney, Agent, or Firm* — Rankin, Hill & Clark LLP

(57) ABSTRACT

A soil processing machine, in particular a soil compactor, comprises a control cabin (18) having at least one control cabin door (20) pivotably supported on a door frame (22) between a closed position and an open position, wherein a handle formation (48) for pivoting the control cabin door (20) between the closed position and the open position is provided on at least one control cabin door (20) on a door inside (53) facing a control cabin interior (51) in the closed position, further comprising a fixing arrangement (46) for fixing the control cabin door (20) in the open position, wherein the fixing arrangement (46) is operable by means of the handle formation (48) for releasing the control cabin door (20) fixed in the open position.

20 Claims, 11 Drawing Sheets

(56) References Cited

U.S. PATENT DOCUMENTS

2013/0322999 A1    12/2013  Kimura et al.

FOREIGN PATENT DOCUMENTS

EP          3468820       12/2017
JP          200444217      2/2004

OTHER PUBLICATIONS

German Search Report for German patent application No. 10 2019 102 999.6, dated Dec. 9, 2019, 8 pages (German).

* cited by examiner

SOIL PROCESSING MACHINE

The present invention relates to a soil processing machine, such as a soil compactor, which has a control cabin for an operator operating the soil processing machine.

In order to gain access to the control cabin in such soil processing machines, it has at least one control cabin door, generally on both sides of the control cabin with respect to a machine longitudinal direction, which can be pivoted between an open position and a closed position and, for example, can be locked in the closed position by means of a locking formation with respect to a door frame, and in particular can also be closed off. In the working mode of such a soil processing machine, it may be advantageous or necessary for a control cabin door to be opened or to be kept in the open position in order to give an operator the opportunity to be able to better observe the side region of the soil processing machine or the soil region located there from the control cabin.

It is the object of the present invention to provide a soil processing machine in which a control cabin door or a control cabin window can also be transferred between a closed position and an open position in a simple and reliable manner from the control cabin.

This object is achieved according to the invention by a soil processing machine, in particular a soil compactor, comprising a control cabin with at least one control cabin door/window unit pivotably supported on a door/window frame between a closed position and an open position, wherein a handle formation for pivoting the control cabin door/window unit between the closed position and the open position is provided on at least one control cabin door/window unit on one door/window inside facing a control cabin interior in the closed position, further comprising a fixing arrangement for fixing the control cabin door/window unit in the open position, wherein the fixing arrangement is operable by means of the handle formation for releasing the control cabin door/window unit fixed in the open position.

In the construction of a soil processing machine according to the invention, by accessing the handle formation, an operator cannot only pivot a control cabin door or a control cabin window from the control cabin, for example, in order to transfer it from the open position to the closed position. Due to the interaction of the handle formation with the fixing arrangement, when, for example, the control cabin door, which is initially fixed in the open position, is to be closed again or moved in the direction of the closed position, and when an operator actuates the handle formation, the fixing effect of the fixing arrangement can then be released, so that no additional manipulation is required for an operator in order to release an existing fixation in the open position when moving a control cabin door from the open position in the direction of the closed position. This interaction between the handle formation and the fixing arrangement further enables the control cabin door to be mechanically fixed by means of the fixing arrangement in the open position by means of interlocking members and not only to be pretensioned in the open position. With a construction that is easy to implement, this ensures that even comparatively strong movements of a soil processing machine or strong air movements cannot lead to an unintentional movement of the control cabin door from the open position.

To achieve a stable fixation, it can be provided that the fixing arrangement comprises a fixing member which is fixed with respect to the control cabin and, on the control cabin door/window unit in association with the fixing member, a counter-fixing member which is adjustable between a fixing position and a release position and which can be in or brought into fixing engagement with the fixing member for fixing the control cabin door/window unit in the open position.

If the counter-fixing member is pretensioned into its release position and can be released by the handle formation for adjustment in its release position, the interaction of the handle formations with the fixing arrangement basically requires only one action on the counter-fixing member in one direction. This leads to a construction that is easy to implement.

For example, the handle formation can comprise a handle element which can be adjusted between a rest position and an actuation position and, upon adjustment from the rest position to the actuation position, acts on the fixing arrangement for releasing the control cabin door/window unit fixed in the open position. The handle element can be designed such that its adjustment to the actuating position then occurs when an operator acts on the handle element in order to pivot the control cabin door/window unit, which is initially fixed in the open position, from the open position in the direction of the closed position.

In this way, the handle element can be pivoted between the rest position and the actuation position for a construction that is easy to implement. Furthermore, for a defined positioning of the handle element, it can be provided that the handle element is pretensioned into its rest position. The interaction between the handle element and the fixing arrangement can take place in that the handle element acts on the fixing arrangement via a coupling element. This makes it possible to provide the handle formation on the one hand and the fixing arrangement on the other hand in different regions of a control cabin door/window unit.

The coupling element can comprise a coupling slide for a defined acting movement implementation, and a coupling slide actuating section assigned to the coupling slide and acting on the coupling slide for actuating the fixing arrangement when adjusting the handle element in the direction of the actuating position can be provided on the handle element.

For a defined interaction of the coupling element with the counter-fixing member, it is proposed that the coupling element interacts with the counter-fixing member to adjust the latter between the fixing position and the release position, preferably via at least one actuating element, and/or that the coupling element is pretensioned in an acting preparation position.

In order to be able to achieve a defined positioning independently of one another in the region of the handle element on the one hand and of the counter-fixing member on the other hand, it is proposed that the handle element be assigned a first pretensioning arrangement which pretensions it into its rest position, and that the counter-fixing member is assigned a second pretensioning arrangement which pretensions it into its release position and which is effective independent of the first pretensioning arrangement.

The control cabin door/window unit can be pivotally supported about a pivot axis on a pivot connection side on the door/window frame and/or can be locked in the closed position on a locking side lying at a horizontal distance from the pivot connection side by means of a locking formation with respect to the door/window frame. In this case, access to the handle formation for an operator from the control cabin can be facilitated in that the handle formation is arranged offset with respect to a horizontal door/window centre lying between the pivot connection side and the locking side of the control cabin door/window unit in the direction of the pivot connection side. As a result, when the control cabin door/window unit is positioned in the open position, the handle formation is positioned comparatively close to the pivot connection side and thus also close to the control cabin itself.

In order, particularly when the fixing member is positioned on or near the control cabin, to be able to easily implement an interaction thereof with the counter-fixing member for fixing the control cabin door/window unit in the open position, it is proposed that the counter-locking member is arranged offset in the region of the horizontal door/window centre or with respect to the horizontal door/window centre in the direction of the pivot connection side.

The locking formation can comprise a door/window handle arranged offset with respect to the horizontal door/window centre in the direction of the locking side and/or a door/window lock arranged offset with respect to the horizontal door/window centre in the direction of the locking side. In this way, a stable and securely acting locking effect can be achieved by the locking formation. Regardless of the positioning and the configuration of the locking formation, however, it is a substantial advantageous aspect of the present invention that the locking formation can be actuated or acts independently of the handle formation or also the fixing arrangement, and vice versa.

The control cabin door/window unit can also have a door/window top and a door/window bottom lying at a vertical distance from the door/window top. Good access to the handle formation can be achieved in that the handle formation is arranged offset with respect to a vertical door/window centre lying between the door/window top and the door/window bottom in the direction of the door/window top.

The locking formation can then be arranged offset in the region of the vertical door/window centre or with respect to the vertical door/window centre in the direction of the door/window bottom. Thus, the locking formation is also easily accessible from the outside for an operator when he/she wants to open a control cabin door/window unit which is initially locked in the closed position in order to gain access to the control cabin.

In the construction of a soil processing machine according to the invention, it is preferably provided that in the open position the control cabin door/window unit is pivoted to the maximum extent out of the closed position. For this purpose, for example, the control cabin door/window unit can be pivoted between the closed position and the open position with a pivot angle of more than 90°, preferably more than 150°, most preferably approximately 180°.

Furthermore, in a soil processing machine constructed according to the invention, an intermediate position holding formation is provided for holding the control cabin door/window unit in an intermediate position between the open position and the closed position. Such an intermediate position can be, for example, a position in which the control cabin door/window unit is pivoted at an angle of approximately 90° out of the closed position in the direction of the open position. The intermediate position holding formation can comprise, for example, a pretensioning unit acting on the control cabin door/window unit in the direction of the open position and a releasable movement stop against which the control cabin door/window unit is pretensioned or held by the pretensioning unit and which can be released to release the control cabin door/window unit for further pivoting into the open position.

To increase operational safety, it can be further provided that the control cabin door/window unit comprises a lower door/window part and an upper door/window part which can be pivoted independently of the lower window/door part between the closed position and the open position and that the handle formation is provided on the upper door/window part. Thus, the possibility exists for an operator to pivot the upper door/window part into the open position when the lower door/window part is held in the closed position, so that even when the upper door/window part is pivoted into the open position, a barrier that prevents the operator from falling out from the control cabin can be provided by the lower door/window part.

The present invention is described in detail below with reference to the accompanying figures. In which.

Figure 1:
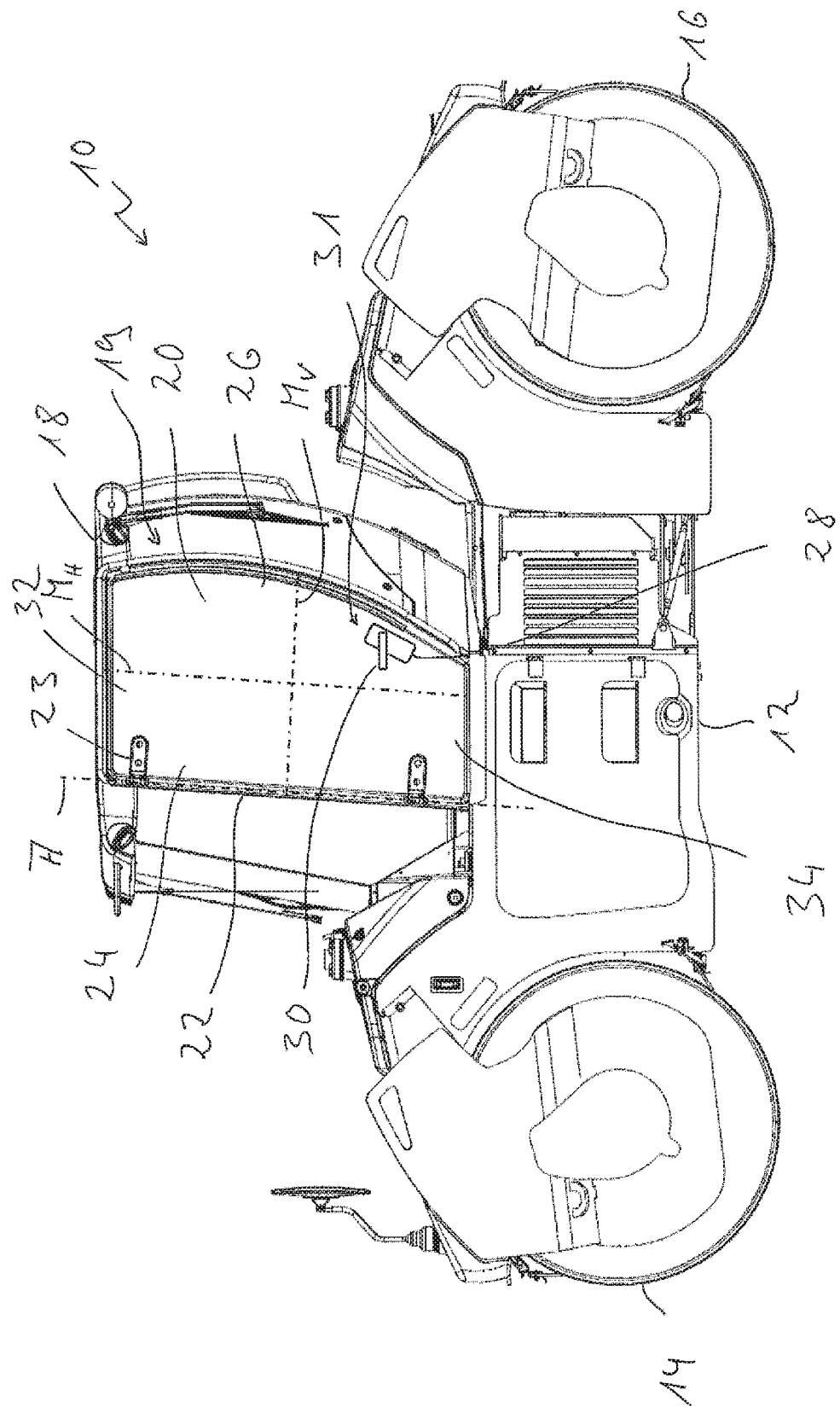
FIG. 1 shows a side view of a soil compactor having a control cabin.

In FIG. 1, a soil processing machine designed in the form of a soil compactor 10 is shown in side view. The soil compactor 10 comprises a machine frame 12 on which two compactor rollers 14, 16 are rotatably supported about respective roller axes of rotation. At least one of the compactor rollers 14, 16 can be driven to rotate the soil compactor 10, and at least one of the compactor rollers 14, 16 can be pivoted with respect to the machine frame 12 to steer the soil compactor 10. For this purpose, a frame supporting such a compactor roller can be pivotable with respect to the machine frame 12 supporting a control cabin 18 providing an operator platform and an operator cabin, respectively. In the example shown in FIG. 1, this is the compactor roller 16 that can be seen on the right. Although such a soil compactor 10 for compacting subsoil, for example an asphalt subsoil, naturally has the same working characteristics in both directions of movement, it can be assumed in the soil compactor shown in FIG. 1 that the compactor roller 14 that can be seen on the left is the front compacting roller, while the compactor roller 16 that can be seen on the right is the rear compactor roller. So if the soil compactor 10 moves to the left in the illustration in FIG. 1, it can be assumed that it is moving forward. If it moves to the right, it can be assumed that it is moving backwards.

At the control cabin 18, on the side of the control cabin 18 that can be seen in FIG. 1, there is a control cabin door/window unit 19 in the form of a control cabin door 20 on a door frame 22 of the control cabin 18 pivotally supported by means of a plurality of hinges 23 on a pivot connection side 24 of the control cabin door 18 [sic] about a pivot axis A. Such a control cabin door can of course also be provided on the side of the control cabin 18 that cannot be seen in FIG. 1.

It should be pointed out that the principles of the present invention explained below with reference to the control cabin door 20 as a control cabin door/window unit 19 can also be used if the control cabin door/window unit 19 is designed as a window, possibly also as a window pivotable about a substantially horizontal axis, or as a window integrated into a door and pivotable with respect to the door, for example, about an approximately vertical axis or about an approximately horizontal axis. Within the meaning of the present invention, a control cabin door/window unit can thus be designed as a door which can be pivoted, for example, about an approximately vertical pivot axis, which can be made in one piece or as a door divided into an upper part and a lower part, and as a window, which, for example, can be pivoted about an approximately vertical or approximately horizontal pivot axis on a window frame provided at the control cabin, or as a window integrated in a door, which can be supported on the door or on a window frame formed on the door so as to be arranged pivotable about a pivot axis, for example substantially parallel to a pivot axis of the door and for example substantially vertically oriented.

In the region of a locking side 26 of the control cabin door 18, which is substantially removed in a horizontal direction from the pivot connection side 24, this can be locked with respect to the door frame 22 by means of a schematically indicated door lock 28. In the region of the door lock 28, a door handle 30 can be provided, via which the control cabin door 20 can be opened and closed. The door lock 28 and the door handle 30 substantially form a locking formation 31 for the control cabin door 20. It can be seen that the door lock 28 or the door handle 30 is offset in the direction of the locking side 26 with respect to a horizontal door centre $M_H$. Furthermore, with respect to a vertical door centre $M_V$, the door lock 28 and the door handle 30 are offset downwards, that is to say from a door top 32 toward a door bottom 34.

It should be pointed out that, for example, the door lock 28 and the door handle 30 could also be arranged in the region of the door bottom 34. Regardless of this positioning, within the meaning of the present invention, the side of the control cabin door 20 which is arranged at a horizontal distance from the pivot connection side 24 is referred to as the locking side 26.

Figure 2:
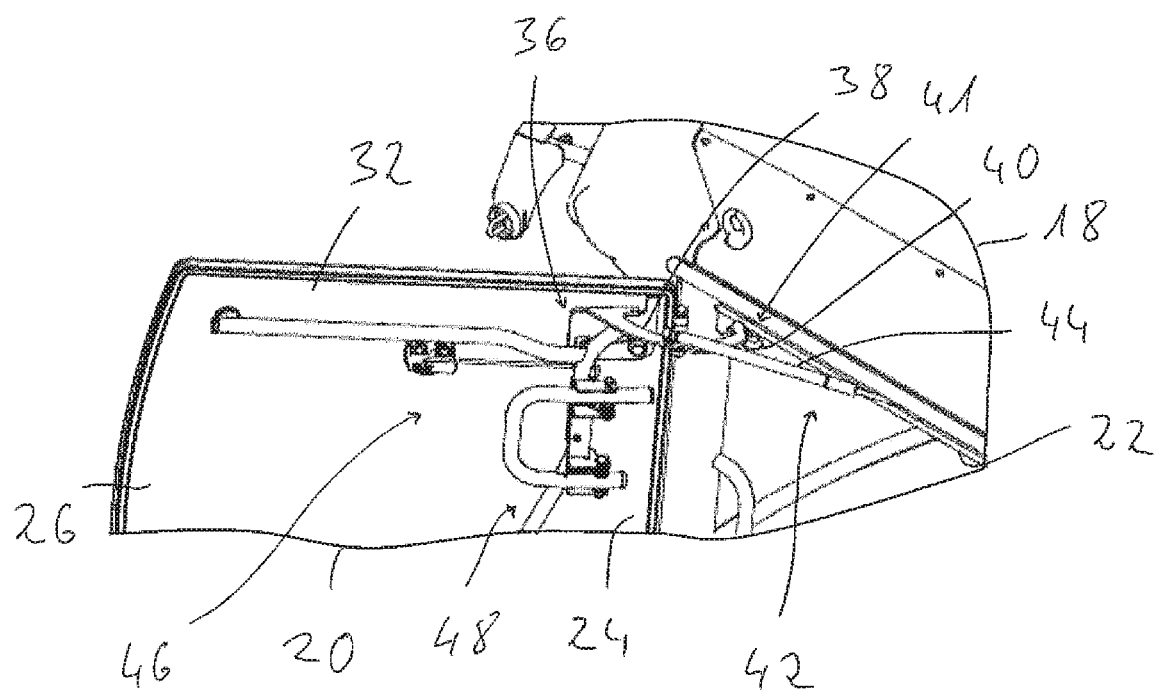
FIG. 2 shows a detailed view of a control cabin which can be used in the soil compactor of FIG. 1 having a control cabin door pivotally supported thereon with an intermediate position holding formation acting between the control cabin door and the control cabin.

FIG. 2 shows in more detail an intermediate position holding formation 36 which acts between the control cabin door 20 and the door frame 22 of a control cabin 18 which can be used in the soil compactor 10 of FIG. 1. This includes an arc-shaped retaining bracket 38, which is attached in the region of the door top 32 close to the pivot connection side 24 and which interacts with a retaining bolt 40 provided on the door frame 22 for holding the control cabin door 20 in an intermediate position and forms a releasable movement stop 41 for the control cabin door 20. In this intermediate position, for example, the control cabin door 20 can be pivoted about 90°, starting from the closed position shown in FIG. 1. A gas pressure spring 44, which acts as a pretensioning unit 42, pretensions the control cabin door 20 from the closed position in the direction of the intermediate position or to an open position, so that when the intermediate position is reached, the retaining bracket 38 interacts with the retaining bolt 40 and prevents a further pivoting of the control cabin door 20 via the intermediate position in the direction of the open position. This engagement between the retaining bolt 40 and the retaining bracket 38 can be released, for example, by pulling on the retaining bolt 40, so that the control cabin door 20 is released for further pivoting in the direction of the open position even under the pretensioning action of the gas pressure spring 44. Such an open position, which is explained in more detail below, can be, for example, a position in which the control cabin door 20 is pivoted by approximately 180° with respect to the closed position shown in FIG. 1., based on a forward direction of travel of the soil compactor 10, i.e. is pivoted forward.

The interaction of a fixing arrangement 46 acting between the control cabin door 20 and the control cabin 18 with a handle formation 48 provided on the control cabin door 20 is described below with reference to FIGS. 3 to 11. The control cabin door 20 can be fixed in the open position with respect to the control cabin 18 by the fixing arrangement 46, so that an unintentional pivoting back in the direction of the closed position can be reliably prevented. As already stated above, the open position of the control cabin door 20 can be a position in which it is pivoted by approximately 180° with respect to the control cabin 18, which in particular also means that the open position is the pivot position of the control cabin door in which it is pivoted starting from the closed position to the maximum extent about the pivot axis A with respect to the control cabin 18.

Figure 3:
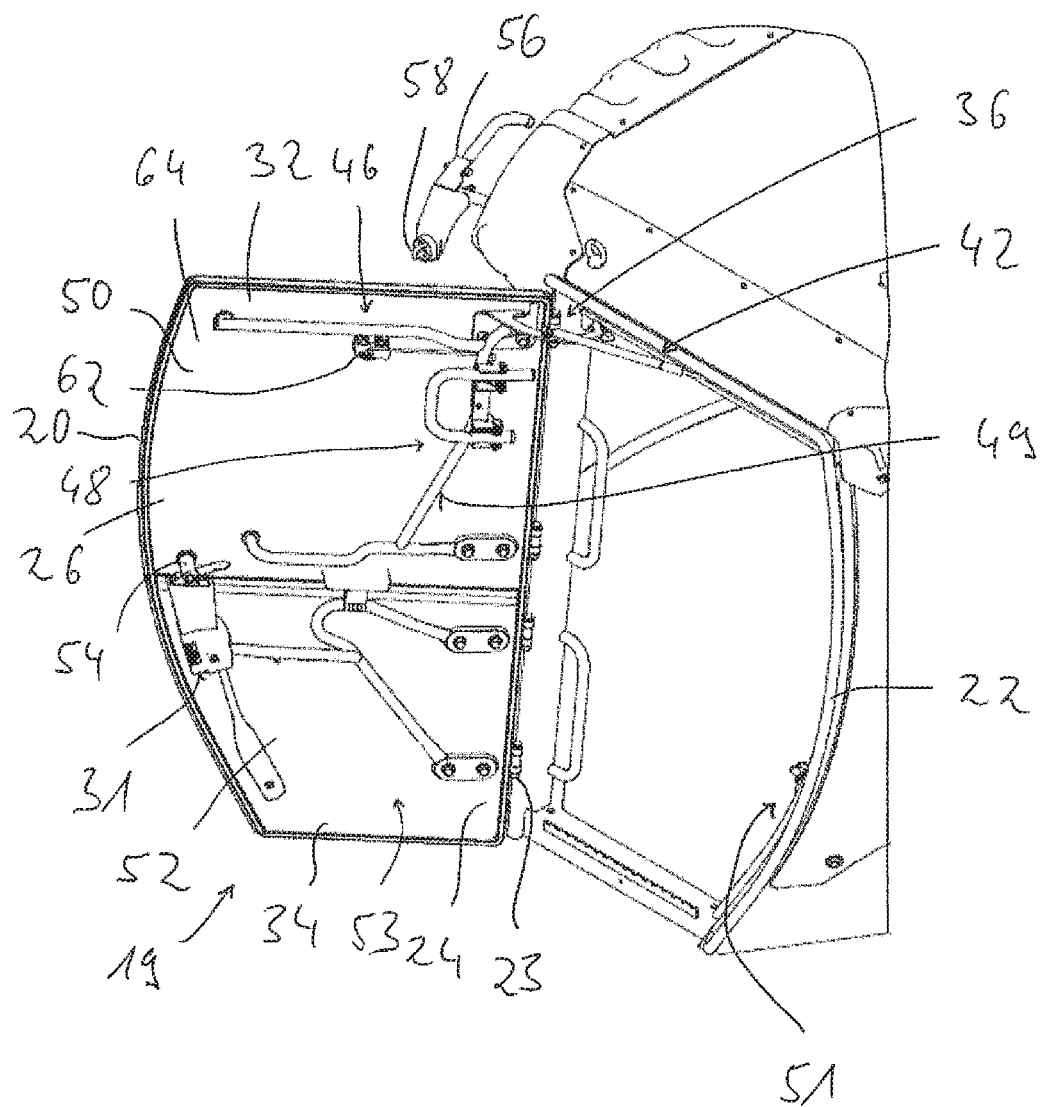
FIG. 3 shows the control cabin that can be used in the soil compactor of FIG. 1 having a control cabin door that can be fixed in an open position by a fixing arrangement.

FIG. 3 shows the control cabin door 20 in a pivoted position, in which it is located between the closed position and the open position, in particular also the previously mentioned intermediate position and the open position. It should be pointed out that, unlike the control cabin door 20 shown in FIG. 1, for example, the control cabin door 20 shown in FIG. 3 is divided and has an upper door part 50 and a lower door part 52. Each of these two door parts 50, 52 is pivotally supported by a plurality of hinges 23 on the door frame 22 of the control cabin 18. By means of a coupling mechanism 54, the two door parts 50, 52 can be coupled to one another for joint pivoting. For example, the locking formation 31 can be provided on the lower door part 52, so that when the upper door part 50 and the lower door part 52 are decoupled from one another, the lower door part 52 can remain in the closed position, for example, while the upper door part 50 can be opened, for example up to the intermediate position or above the intermediate position up to the open position. When the door parts 50, 52 are coupled to one another, they pivot together between the closed position and the intermediate position or the open position. It should be pointed out that the upper door part 50 can act like a window within the meaning of the present invention. That is to say, basically only the upper door part 50 could be provided as a window, while the lower door part 52 is designed to be stationary at the control cabin 18 and, for example, the control cabin 18 can be entered via a door provided on the other side.

Figure 4:
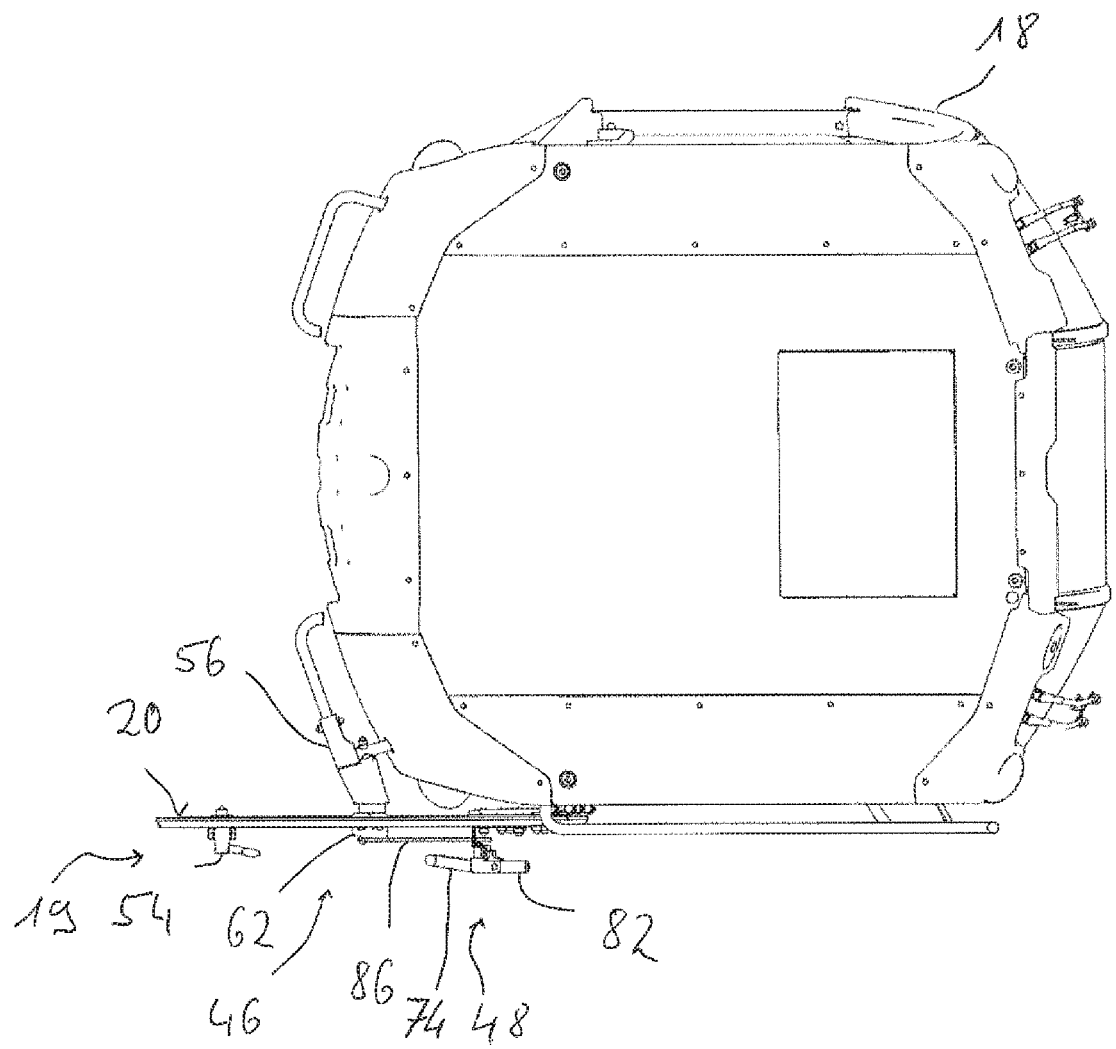
FIG. 4 shows a top view of the control cabin of FIG. 3 having the control cabin door fixed in the open position.
Figure 5:
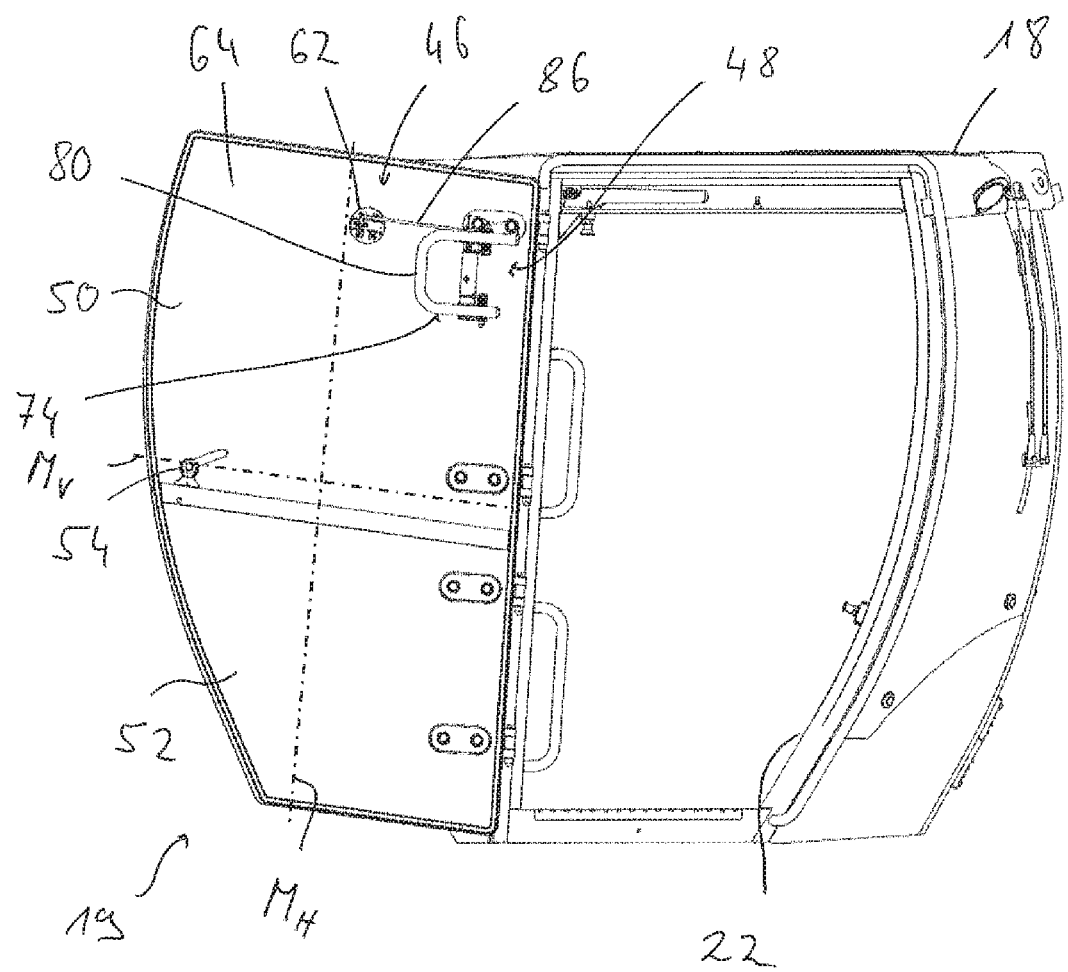
FIG. 5 shows a side view of the control cabin having the control cabin door fixed in the open position.
Figure 6:
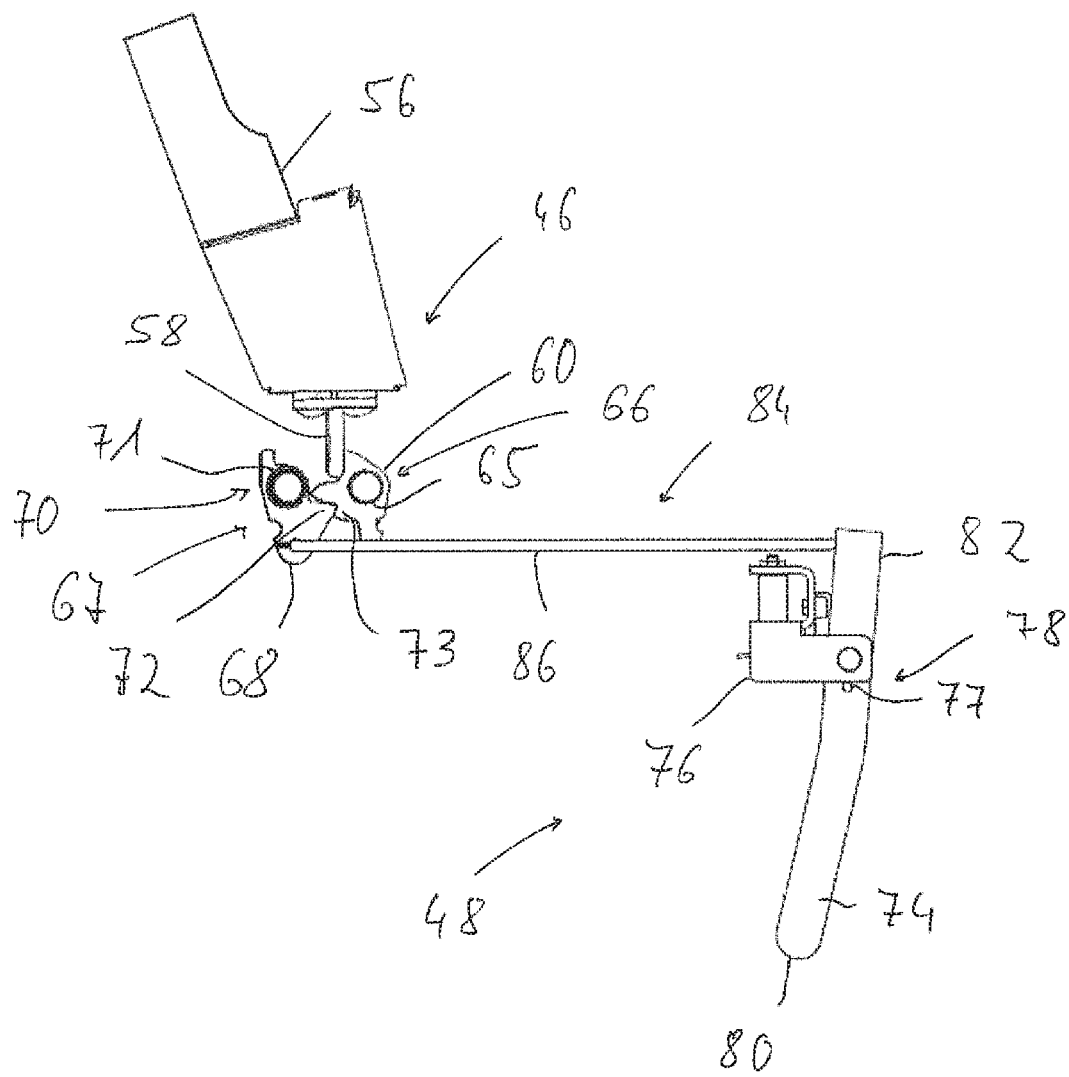
FIG. 6 shows a fixing arrangement provided on the control cabin door having a counter-fixing member arranged in a fixing position with the handle element of a handle formation pivoted in the direction of an actuating position.

FIGS. 4 to 6 show in greater detail the control cabin door 20 fixed in the open position and also the fixing arrangement 46 and the handle formation 48 interacting therewith. The intermediate position holding formation 36 described above with reference to FIG. 2 is not shown in FIG. 4 and also the following representations in order to better recognise the system regions explained in detail below. For this reason, the pretensioning unit 42, which pretensions the control cabin door 20 in the direction of the open position or the intermediate position, for example gas pressure spring 44, is also not shown in FIG. 4 and the following illustrations. This also applies to a support bracket formation, generally designated 49, by means of which various system regions, such as the handle formation 48 or the locking formation 31, are supported on a door inside 53 of the control cabin door 20 which faces the control cabin door interior 51 when the control cabin door 20 is closed.

The fixing arrangement 46 comprises a fixing member 58 which is firmly supported on the control cabin 18 by means of a support arrangement 56. A hook-like counter-fixing member 60 engages in this fixing member 58 and is pivotably supported in a support arrangement 62 on the control cabin door 20, in particular a window pane 64 thereof. The hook-like counter-fixing member 60 is pretensioned clockwise, for example by a leg spring 65, in the representation of FIG. 6, that is to say in the direction of a release position thereof.

Associated with the counter-fixing member 60 is an actuating lever 68 which is also pivotably supported in the support arrangement 62 and which provides an actuating element 67 for the counter-fixing member 60. This is pretensioned by a pretensioning arrangement 70 associated therewith, for example a leg spring 71 again, in a pretensioning direction opposite the pretensioning direction of the counter-fixing member 60 for pivoting movement, that is to say in the illustration in FIG. 6 for pivoting in the anticlockwise direction. In this state, a blocking projection 72 provided on the actuating lever 68 engages on a cam 73 provided on the counter-fixing member 60 and thus blocks the counter-fixing member 60 pretensioned by the pretensioning arrangement 66 for pivoting in the direction toward its release position against such pivoting and keeps it in the fixing position in engagement with the fixing member 58 that can be seen in FIG. 6.

If the control cabin door 20, which is fixed in the open position in this way, is to be released and pivoted in the direction of the closed position, an operator can pull on a handle element 74 of the handle formation 48 from the control cabin 18. The handle element 74 is pivotably supported on a support arrangement 76 supported on the support bracket formation 49 on the control cabin door 20 and in the direction of its rest position, for example shown in FIG. 3, in which the handle element 74 extends substantially parallel to the control cabin door 20 or is applied to the control cabin door 20, pretensioned by a pretensioning arrangement 78 comprising, for example, a leg spring 77. If an operator engages a handle region 80 of the handle element 74 when it is in its rest position which can be seen in FIGS. 3 to 5, then the handle element 74 pivots out of this rest position such that the handle region 80 moves away from the control cabin door 20 or the window pane 64 thereof. A coupling slide actuating section 82 of the handle element 74 approaches a coupling slide 86 which provides a coupling element 84 and is designed, for example, as a rod. The coupling slide 86 is motionally coupled to the actuating lever 68 and is pretensioned by its pretensioning arrangement 70 into an actuating preparation position, into which it is pushed to the maximum extent to the right in the illustration in FIG. 6, i.e. in principle to the maximum extent in the direction of the pivot connection side 24 of the control cabin door 20.

In the course of the pivoting movement of the handle element 74, its coupling slide actuation section 82 comes into contact with the coupling slide 86 held in the actuating preparation position. Upon further pivoting of the handle element 74 in the direction of its actuating position, which can also be seen in FIGS. 7-9, for example, this displaces the coupling slide 86 from its actuating preparation position to the left in the illustration in FIG. 6, which leads to a corresponding pivoting of the actuating lever 68 against the pretensioning effect of the pretensioning arrangement 70 assigned to it. In the course of this pivoting movement, the blocking projection 72 acts on the cam 73 and thus initially pivots the counter-fixing member 60 slightly against the pretensioning effect of the pretensioning arrangement 66 associated therewith in the direction of the fixing position or beyond the fixing position. When the blocking projection 72 moves over the cam 73, the actuating lever 68 releases the counter-fixing member 60 for pivoting, so that it can pivot under the pretensioning action of the pretensioning arrangement 66 associated therewith into its release position shown in FIG. 9. In this release position, the blocking projection 72 of the actuating lever 68 initially blocks the counter-fixing member 60 against further pivoting.

Figure 7:
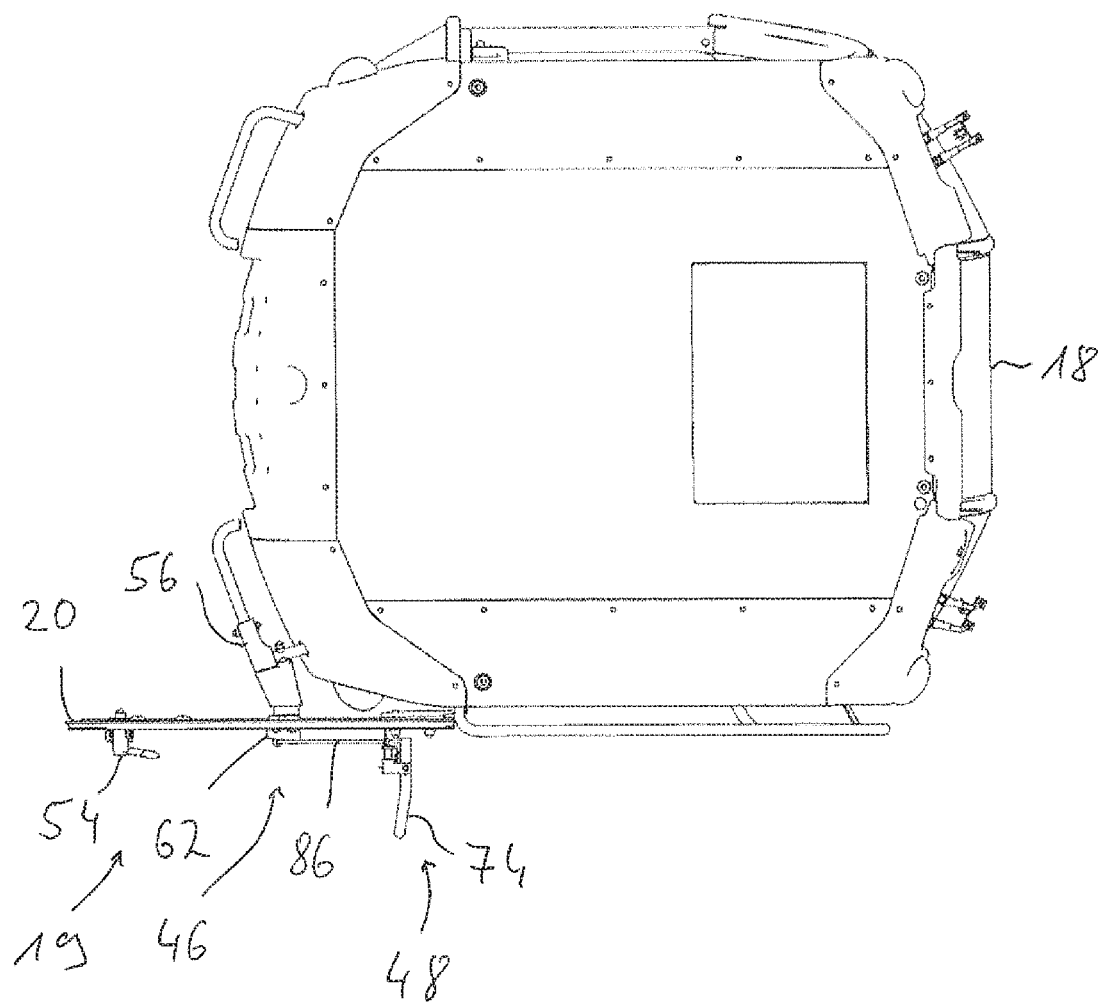
FIG. 7 shows the control cabin having the control cabin door held in the open position and the handle element positioned in an actuation position.
Figure 8:
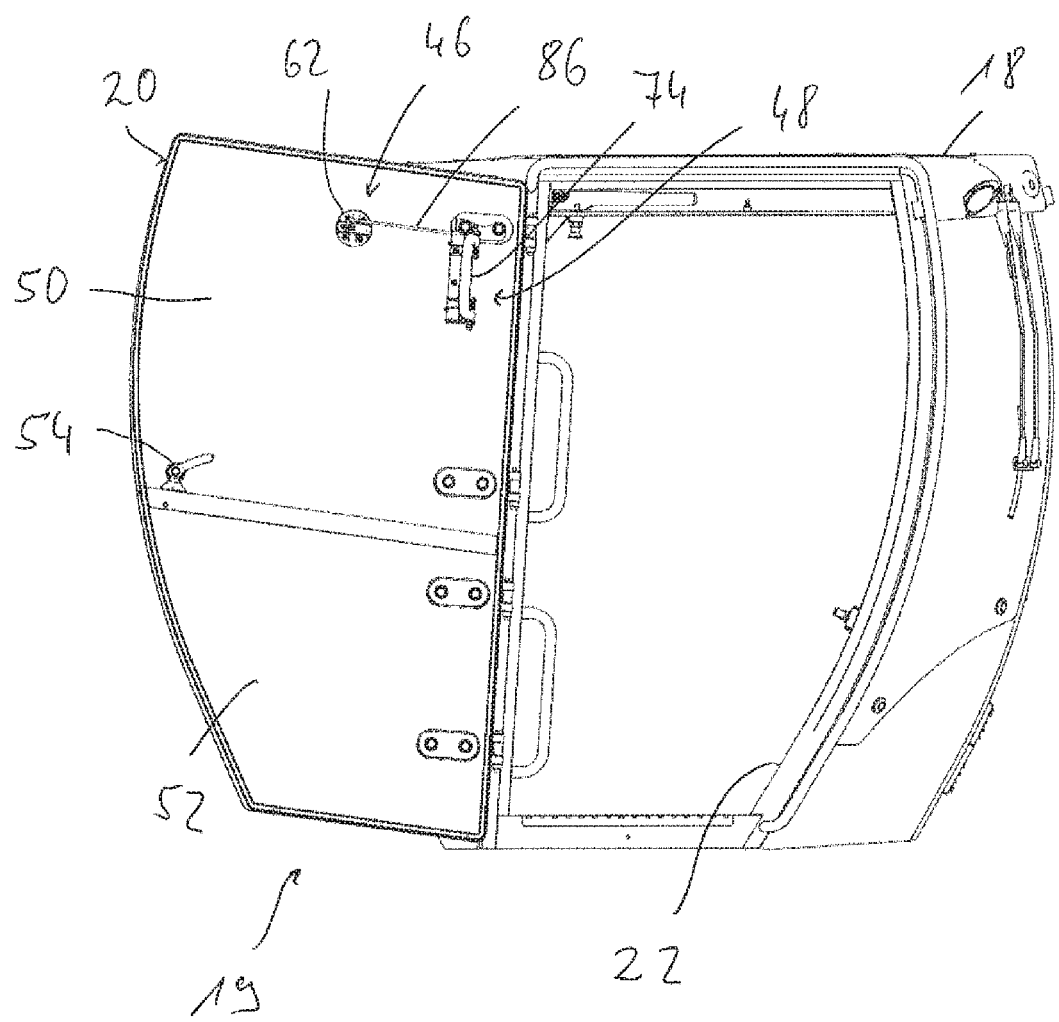
FIG. 8 shows a side view of the control cabin having the handle element positioned in the actuation position.
Figure 9:
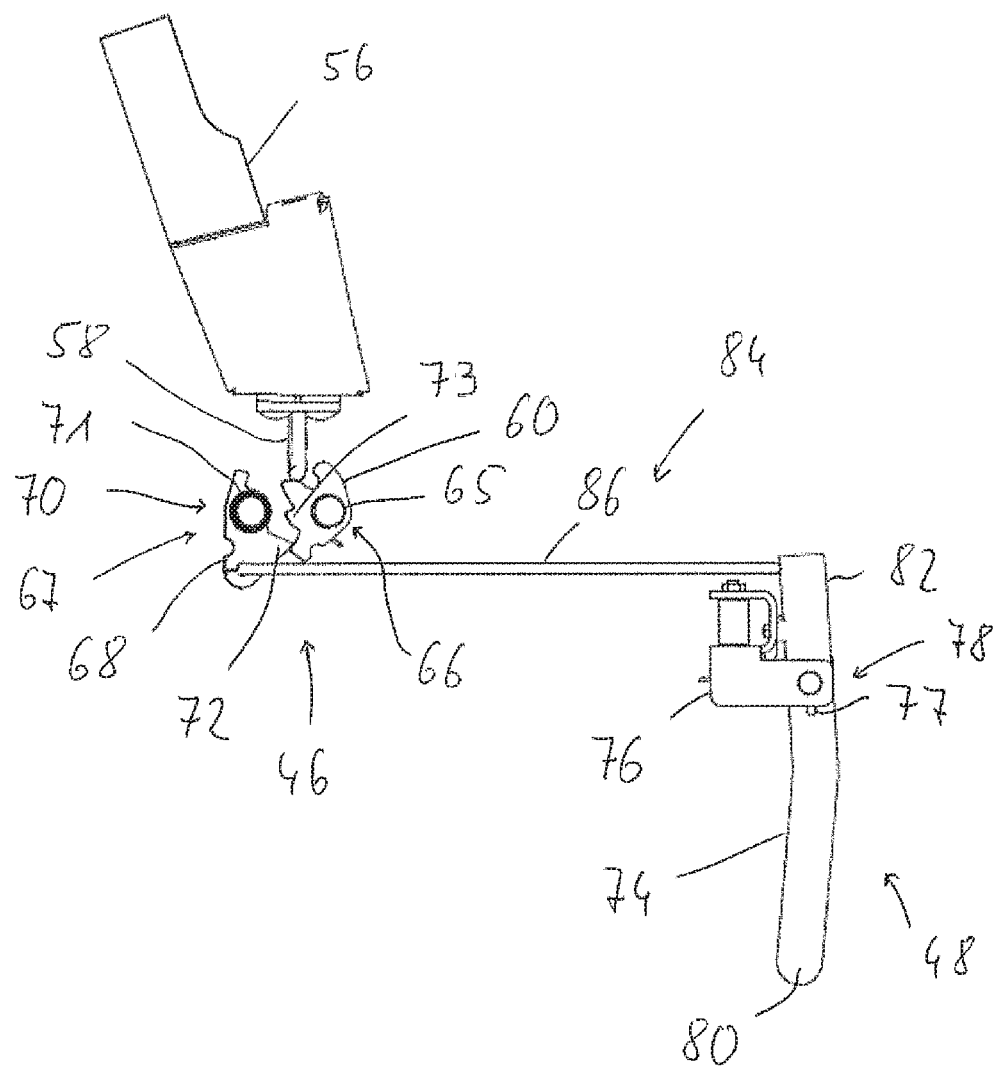
FIG. 9 shows the fixing arrangement with the handle element arranged in the actuating position and the counter-fixing member acted upon to release the fixing member.

By pivoting the handle element 74 from the rest position shown in FIGS. 3 to 5 to the actuation position shown in FIGS. 7 to 9, the fixing effect of the fixing arrangement 46 is thus released on the one hand. On the other hand, the force exerted on the control cabin door 20 pivots it out of the open position and, for example, brings it into the closed position.

Figure 10:
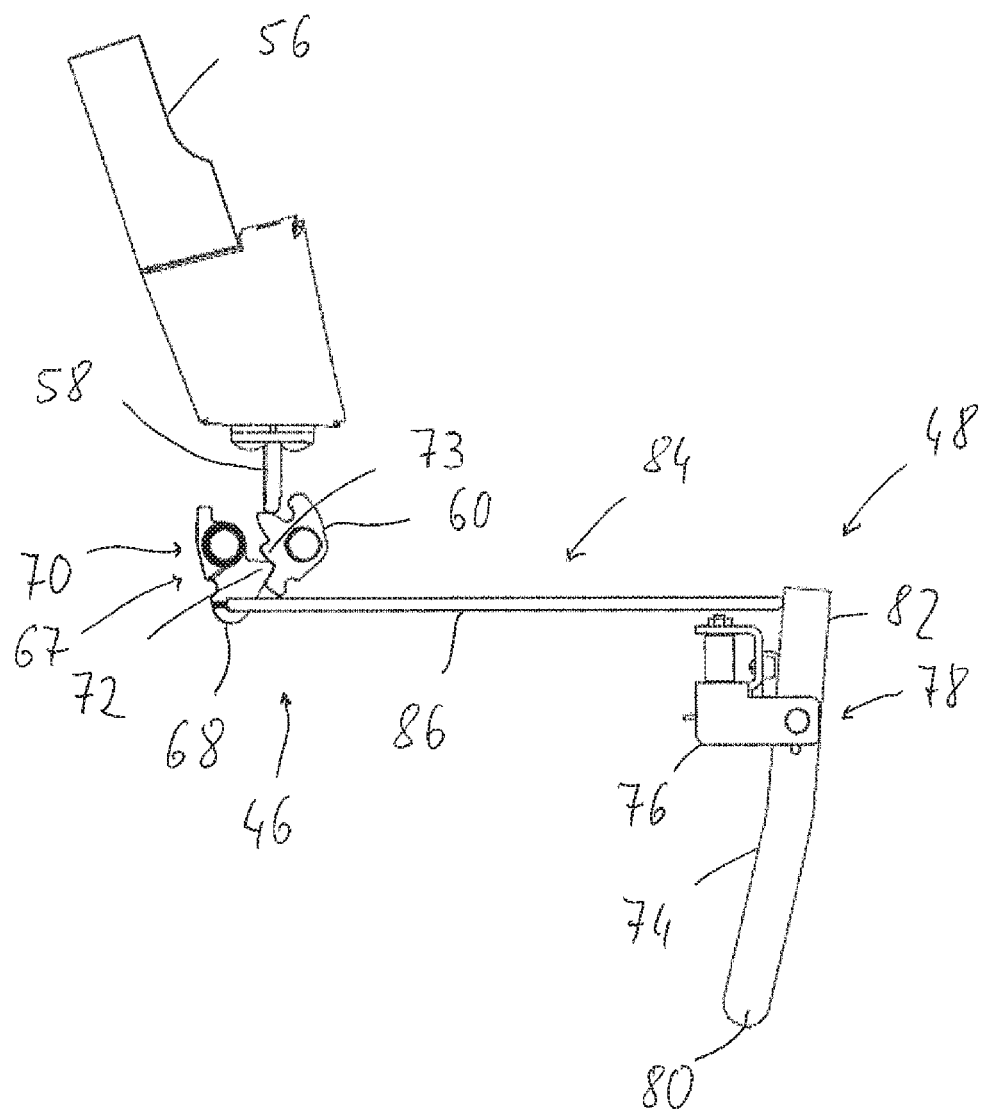
FIG. 10 shows the fixing arrangement having a counter-fixing member arranged in a release position.
Figure 11:
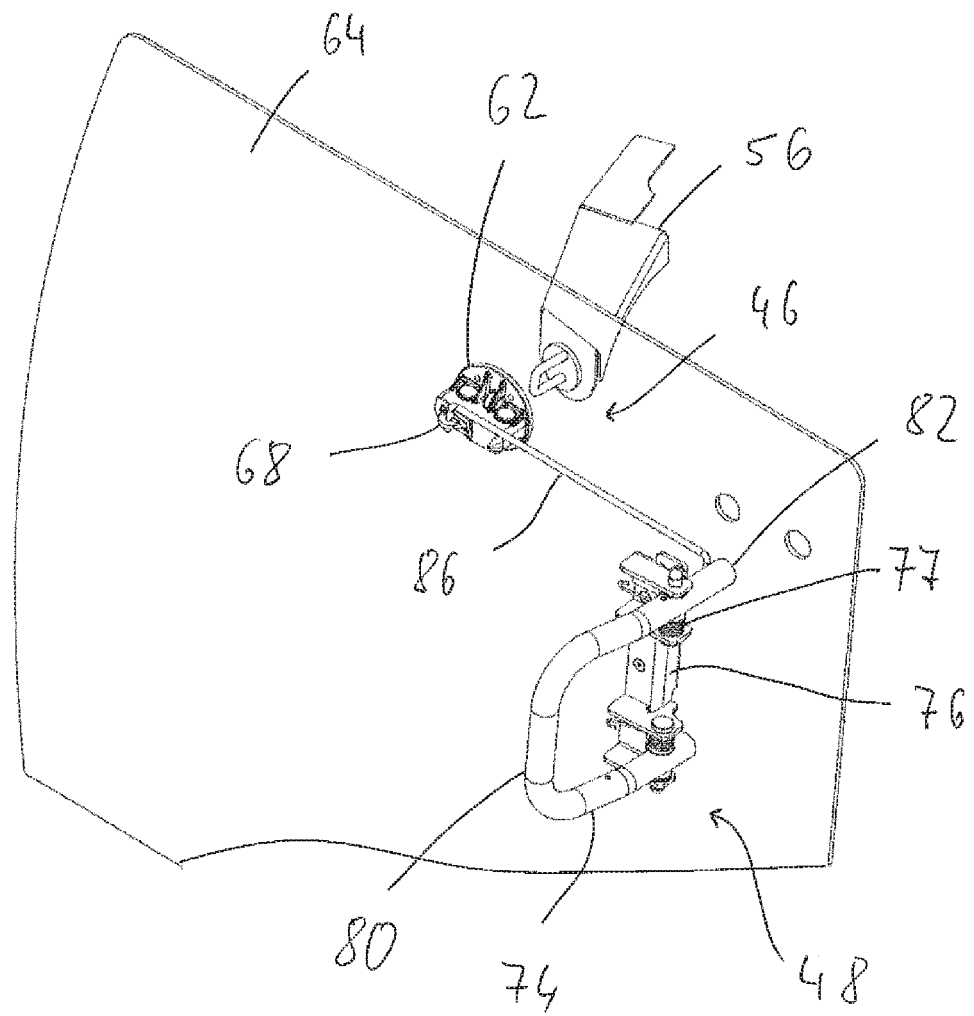
FIG. 11 shows the fixing arrangement arranged in the region of a window pane of the control cabin door having the counter-fixing member decoupled from a fixing member.

If the action on the handle element 74 is abandoned when the control cabin door 20 is pivoted out of the open position, it pivots back into its rest position. In doing so, the coupling slide actuating section 82 releases the coupling slide 86. This leads to the fact that the actuation lever 68 can pivot under the pretensioning action of the pretensioning arrangement 70 and thereby moves the coupling slide 86 into its actuation preparation position. This pivoting continues until, as shown in FIG. 10, the blocking projection 72 comes into contact with the cam 73. A further pivoting of the actuating lever 68 is then not possible due to the counter-fixing member 60, which is pretensioned into its release position and held therein. The counter-fixing member 60 and the actuating lever 68 block each other in this state against further pivoting.

If, starting from the state shown in FIG. 10, the control cabin door 20 is pivoted again in the direction of the open position when the handle element 74 is pivoted back into its rest position, for example according to FIG. 4, the counter-fixing member 60 comes into contact with the fixing member 58. This now acts on the counter-fixing member 60 for pivoting against the pretensioning effect of the pretensioning arrangement 66 associated therewith, that is to say in the illustration in FIG. 10 for pivoting in the anticlockwise direction. The counter-fixing member 60 comes into engagement with the fixing member 58 and, by means of the interaction of the cam 73 with the blocking projection 72, pivots the actuating lever 68 against the pretensioning effect of the pretensioning arrangement 70 assigned to it, until the cam 73 has moved over the blocking section 72 and the actuating lever 68 once again reaches the position that can be seen in FIG. 6 and blocking the counter-fixing member 60 in its fixing position and holding the coupling slide 86 in its actuation preparation position. In this state, the actuating lever 68 and the counter-fixing member 60 mutually block against pivoting, so that the counter-fixing member 60 is reliably held in engagement with the fixing member 58. To release this fixing action again, the handle element 74 can then be pivoted out of the rest position in the direction of its actuating position in the manner described above.

The construction described above creates in a simple manner the possibility, on the one hand, of reliably holding a control cabin door in the open position, that is to say a position pivoted to a maximum from the closed position. On the other hand, due to the interaction of the handle element with the fixing arrangement, an operator positioned in the control cabin can simply both cancel the fixing effect by acting on the handle element and also pivot the control cabin door in the direction of the closed position. For this purpose, it is particularly advantageous that the handle formation with its handle element is positioned close to the pivot connection side of the control cabin door, that is to say the side which is closer to an operator positioned in the control cabin. It is also advantageous that the handle formation and with it also the fixing arrangement is arranged near the top of the door, which on the one hand facilitates access to the handle element and on the other hand in particular also enables the lower and central region of the control cabin door to be viewed.

It should be pointed out that such an embodiment of a control cabin door can of course be implemented on both sides of a control cabin, so that the control cabin doors provided on both sides of such a control cabin can be actuated in the same manner or fixed in the open position. The mechanism described above for fixing a control cabin door can also be used in the case of a divided control cabin door, as is shown, for example, in FIG. 1.

As already stated, the principles of the present invention can also be applied to a window which acts as a control cabin door/window unit and which, for example, can be pivoted about an approximately horizontal axis or an approximately vertical axis on a frame of the control cabin and in an open position can be fixed, which in particular when such a window can be pivoted about an approximately horizontal axis, can be pivoted by approximately 90° with respect to a closed position of such a window, so that in the open position in which the window with the mechanism described above is to be fixed, the window is oriented approximately horizontally, for example, and is thus pivoted out of the field of vision of an operator. Corresponding to such a window or to the counter-fixing member provided on the window and to be actuated by the handle formation likewise provided on the window, the fixing member is to be provided at a suitable position on the control cabin. Such a window can also be integrated in a control cabin door. The handle formation and the fixing member of the fixing arrangement can be provided on the window pivotably supported on the door, for example, about an approximately vertical pivot axis or a pivot axis which is substantially parallel to a pivot axis of the door. Since, depending on whether the window is pivoted alone or together with the door, the fixing member will move through different movement paths in the course of the pivoting movement and will assume different spatial positions in the open position of the window alone or the open position of the door with the window, in such a configuration, for example, two fixing members are to be provided at different positions on the control cabin. One of the fixing members can then cooperate with the counter-fixing member if the window alone is pivoted into an open position when the door is basically closed. The other fixing member can cooperate with the counter-fixing member if the window is pivoted together with the door and is brought into an open position.

The invention claimed is:

1. Soil processing machine, comprising a control cabin having at least one control cabin door/window unit pivotably supported on a door/window frame between a closed position and an open position, wherein a handle formation for pivoting the control cabin door/window unit between the closed position and the open position is provided on at least one control cabin door/window unit on a door/window inside facing a control cabin interior in the closed position, further comprising a fixing arrangement for fixing the control cabin door/window unit in the open position, wherein the fixing arrangement is operable by the handle formation for releasing the control cabin door/window unit fixed in the open position, wherein the handle formation comprises a handle element which is adjustable between a rest position and an actuation position and, upon adjustment from the rest position to the actuation position, acts on the fixing arrangement for releasing the control cabin door/window unit fixed in the open position.

2. Soil processing machine according to claim 1, wherein the fixing arrangement comprises a fixing member which is fixed with respect to the control cabin and, on the control cabin door/window unit in association with the fixing member, a counter-fixing member which is adjustable between a fixing position and a release position and which can be in or brought into fixing engagement with the fixing member for fixing the control cabin door/window unit in the open position.

3. Soil processing machine according to claim 2, wherein the counter-fixing member is pretensioned into its release position and is releasable for adjustment into its release position by means of the handle formation.

4. Soil processing machine according to claim 1, wherein the handle element is pivotable between the rest position and the actuation position, and/or wherein the handle element is pretensioned in its rest position, and/or wherein the handle element acts on the fixing arrangement via a coupling element.

5. Soil processing machine according to claim 4, wherein the coupling element comprises a coupling slide, and wherein a coupling slide actuating section assigned to the coupling slide and acting on the coupling slide for actuating the fixing arrangement when adjusting the handle element in the direction of the actuating position is provided on the handle element.

6. Soil processing machine according to claim 2, wherein the coupling element interacts with the counter-fixing member to adjust the latter between the fixing position and the release position and/or wherein the handle element acts on the fixing arrangement via a coupling element that is pretensioned in an acting preparation position.

7. Soil processing machine according to claim 2, wherein the handle element is assigned a first pretensioning arrangement which pretensions it into its rest position, and wherein the counter-fixing member is assigned a second pretensioning arrangement which pretensions it into its release position and is effective independently of the first pretensioning arrangement.

8. Soil processing machine according to claim 1, wherein the control cabin door/window unit is pivotally supported on a pivot connection side on the door/window frame about a pivot axis (A) and/or is lockable in the closed position by means of a locking formation with respect to the door/window frame on a locking side lying at a horizontal distance to the pivot connection side, and wherein the handle formation is arranged offset with respect to a horizontal door/window centre ($M_H$) lying between the pivot connection side and the locking side of the control cabin door/window unit in the direction of the pivot connection side.

9. Soil processing machine according to claim 2, wherein the control cabin door/window unit is pivotally supported on a pivot connection side on the door/window frame about a pivot axis and/or is lockable in the closed position by means of a locking formation with respect to the door/window frame on a locking side lying at a horizontal distance to the pivot connection side, and wherein the handle formation is arranged offset with respect to a horizontal door/window centre lying between the pivot connection side and the locking side of the control cabin door/window unit in the direction of the pivot connection side, and wherein the counter-locking member is arranged offset in the region of the horizontal door/window centre ($M_H$) or with respect to the horizontal door/window centre ($M_H$) in the direction of the pivot connection side.

10. Soil processing machine according to claim 8, wherein the locking formation comprises a door/window handle arranged offset with respect to the horizontal door/window centre ($M_H$) in the direction of the locking side and/or a door/window lock arranged offset with respect to the horizontal door/window centre ($M_H$) in the direction of the locking side.

11. Soil processing machine according to claim 1, wherein the control cabin door/window unit has a door/window top and a door/window bottom lying at a vertical distance from the door/window top, and wherein the handle formation is arranged offset with respect to a vertical door/window centre ($M_V$) lying between the door/window top and the door/window bottom in the direction of the door/window top.

12. Soil processing machine according to claim 8, wherein the control cabin door/window unit has a door/window top and a door/window bottom lying at a vertical distance from the door/window top, and wherein the handle formation is arranged offset with respect to a vertical door/window centre lying between the door/window top and the door/window bottom in the direction of the door/window top, wherein the locking formation is arranged offset in the region of the vertical door/window centre ($M_V$) or with respect to the vertical door/window centre ($M_V$) in the direction of the door/window bottom.

13. Soil processing machine according to claim 1, wherein in the open position, the control cabin door/window unit is pivoted to the maximum extent out of the closed position, and/or wherein the control cabin door/window unit is pivotable between the closed position and the open position with a pivot angle of more than 90°.

14. Soil processing machine according to claim 1, wherein an intermediate position holding formation is provided for holding the control cabin door/window unit in an intermediate position between the open position and the closed position.

15. Soil processing machine according to claim 14, wherein the intermediate position holding formation comprises a pretensioning unit acting on the control cabin door/window unit in the direction of the open position and a releasable movement stop.

16. Soil processing machine according to claim 1, wherein the control cabin door/window unit comprises a lower door/window part and an upper door/window part which is pivotable independently of the lower window/door part between the closed position and the open position and wherein the handle formation is provided on the upper door/window part.

17. Soil processing machine according to claim 6 wherein the coupling element interacts with the counter-fixing member to adjust the latter between the fixing position and the release position via at least one actuating element.

18. Soil processing machine according to claim 13, wherein the control cabin door/window unit is pivotable between the closed position and the open position with a pivot angle of more than 150°.

19. Soil processing machine according to claim 18, wherein the control cabin door/window unit is pivotable between the closed position and the open position with a pivot angle of about 180°.

20. Soil processing machine, comprising a control cabin having at least one control cabin door/window unit pivotably supported on a door/window frame between a closed position and an open position, wherein a handle formation for pivoting the control cabin door/window unit between the closed position and the open position is provided on at least one control cabin door/window unit on a door/window inside facing a control cabin interior in the closed position, further comprising a fixing arrangement for fixing the control cabin door/window unit in the open position, wherein the fixing arrangement is operable by the handle formation for releasing the control cabin door/window unit fixed in the open position, wherein an intermediate position holding formation is provided for holding the control cabin door/window unit in an intermediate position between the open position and the closed position.

* * * * *